May 3, 1932.  G. T. JOHNSON  1,856,998
FUEL INTAKE FOR INTERNAL COMBUSTION ENGINES
Filed July 13, 1926  2 Sheets-Sheet 1
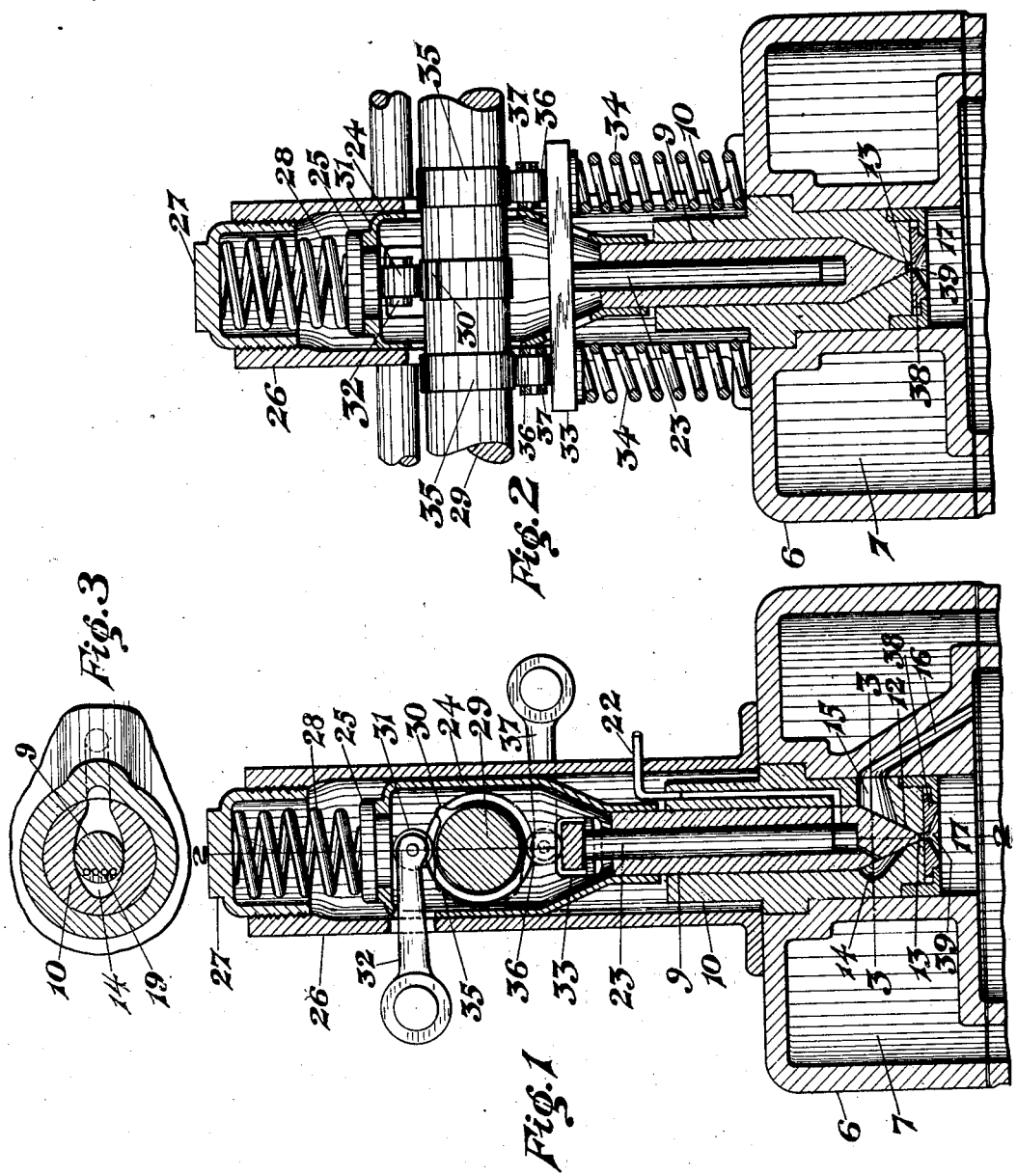
INVENTOR.
George T. Johnson
BY
ATTORNEY.

May 3, 1932.  G. T. JOHNSON  1,856,998
FUEL INTAKE FOR INTERNAL COMBUSTION ENGINES
Filed July 13, 1926   2 Sheets-Sheet 2
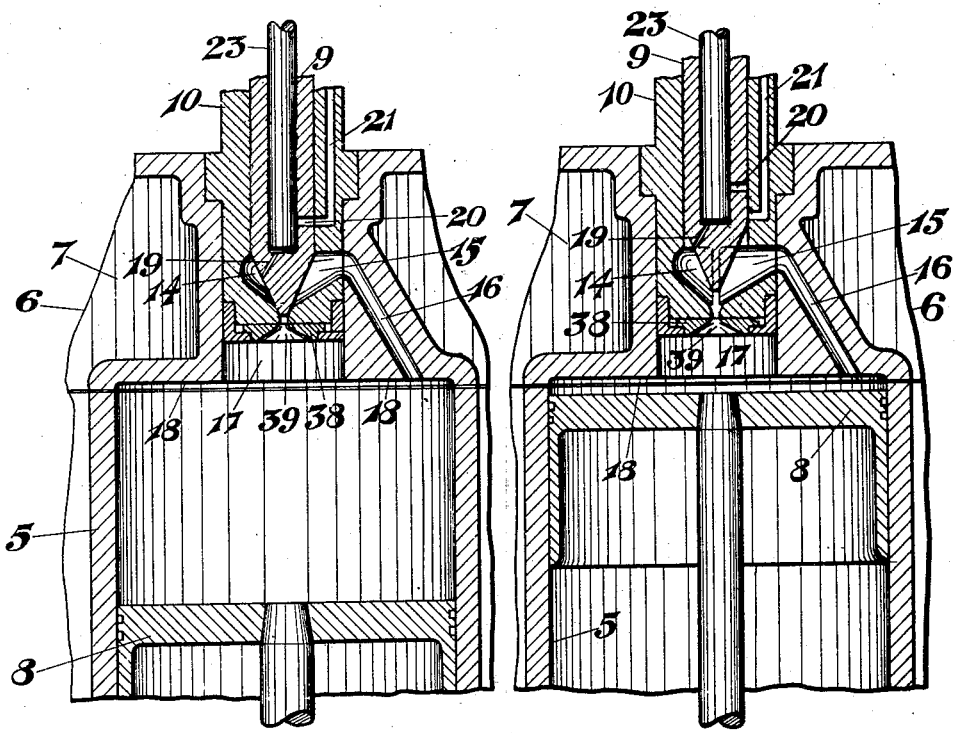
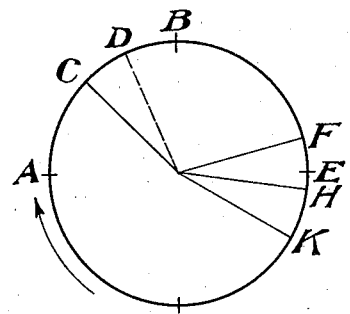
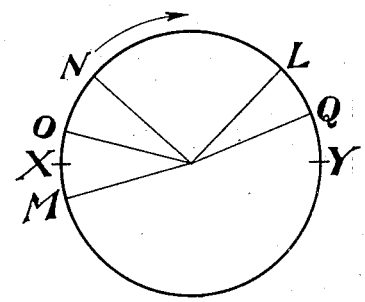
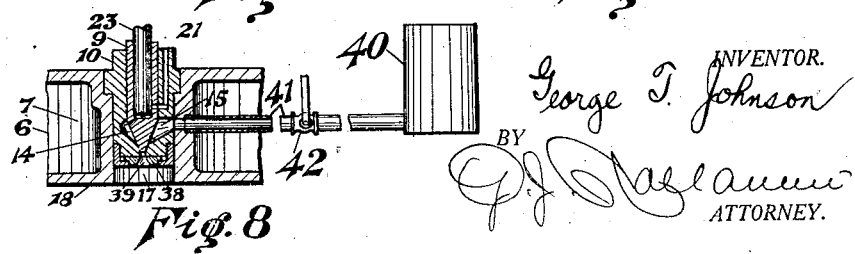
INVENTOR.
George T. Johnson
BY
ATTORNEY.

Patented May 3, 1932

1,856,998

UNITED STATES PATENT OFFICE

GEORGE T. JOHNSON, OF DENVER, COLORADO

FUEL INTAKE FOR INTERNAL COMBUSTION ENGINES

Application filed July 13, 1926. Serial No. 122,199.

My invention relates to internal combustion engines of the "Diesel" type, in which ignition of fuel entering a cylinder at the termination of its compression-stroke is effected by over-compression and consequently increased temperature of air admitted to the cylinder during a preceding stroke. It is, of course, essential that the fuel be caused to enter the cylinder under pressure exceeding that of the air in the cylinder and it is an object of the present invention to produce the fuel-pressure and to time the admission of the fuel-charge to the compression space of the cylinder by a mechanism of simple and reliable operation. Another object of the invention is to produce the overbalancing fuel pressure by the compression of air in the engine cylinder. Another object resides in the provision of means by which the charge of fuel is broken up and finely divided to enter the cylinder in a vaporized condition, a further object of the invention is to provide a mechanism for the above described purposes, which is adapted for use on engines of the two-cycle type as well as on four-cycle engines and still other objects reside in details of construction and a novel arrangement of parts as will fully appear in the course of the following description.

An embodiment of my invention has been illustrated in the accompanying drawings in which like characters of reference designate corresponding parts throughout the several views and in which Figure 1 represents a sectional elevation of an end-portion of a cylinder of an internal combustion engine to which my invention is applied, the parts of the mechanism comprised in the invention having been shown in their normal position at the beginning of the cycle.

Figure 2 a similar sectional elevation taken on the line 2—2 Figure 1.

Figure 3, a transverse section along the line 3—3 Figure 1.

Figure 4, a fragmentary section similar to that of Figure 1, showing the parts of the fuel-control-mechanism of my invention in the position during a period of the intake and compression strokes in the cyclic movement of the piston.

Figure 5, a similar sectional view in which the parts are depicted in their position at the end of the compression stroke, immediately prior to ignition of the charge admitted to the cylinder.

Figure 6, a theoretic diagram illustrating the positions of the moving parts of the invention, in the operation of a four-cycle engine.

Figure 7, a diagram showing the positions of the parts in the operation of a two-cycle engine, and Figure 8, a sectional view similar to Figure 4 but drawn to a reduced scale, showing the valve-mechanism of the invention in connection with a source of fluid-pressure separate from the cylinders of the engine, as a modification in the method of operation.

Referring more specifically to the drawings, the numeral 5 designates a cylinder of an internal combustion engine of the Diesel type, closed at one end by a head 6 and provided with a water-jacket 7. The piston working in the cylinder, has been designated at 8 in Figures 4 and 5, but the ports for the intake of the air and exhaust of products of combustion and the devices controlling the same have not been shown inasmuch as specifically, they form no part of the present invention.

The mechanism included in my invention which prepares the fuel charge and controls its admission to the cylinder is carried in its entirety on the cylinder-head 6 and it comprises a hollow valve member 9, cone-shaped at one end and slidably fitted in a cylindrical bore of a block 10 disposed in an axial opening of the cylinder head.

The bore of the block, which constitutes the valve-chamber, is tapered at its inner end in correspondence with the cone-shaped extremity of the valve member, to provide a seat 12 with which the valve engages, and at the apex of the seat is a port 13 which connects the chamber of the valve block with the interior of the cylinder 5.

The tapered portion of the valve-chamber is enlarged at one side to provide a vaporizing chamber 14, and at a point opposite to the chamber, the valve-chamber is connected with the interior of the cylinder by means of a by-pass composed of alined channels 15 and 16 formed respectively in the valve block 10 and in the cylinder head 6.

When the valve is in its closed position, its conical part engages the seat at the end of its chamber and thereby closes the port 13 and also closes the passage between the vaporizing chamber and the by-pass, as clearly shown in Figure 3 of the drawings.

When the valve is lifted off its seat as shown in Figure 5, the port is open and the vaporizing chamber is connected with the interior of the cylinder by means of the alined channels.

The valve-block terminates at a distance from the end of the opening of the cylinder head in which it is disposed, to provide a low pressure region 17 with which the port in the end of the valve chamber communicates.

The high pressure region is at 18 around the low pressure region, and is connected with the valve chamber by the alined channels.

It will be clear, of course, that the low pressure region 17 is obtained by properly proportioning the size of the by-pass 16. It is merely necessary to so proportion the by-pass 16 whereby same will offer less resistance to a transfer of air effected by the upward movement of the piston 8 then is offered by constantly decreasing clearance passage formed between the annular high pressure region 18 and the chamber 17.

The valve has at the closed end of its hollow a plurality of small ducts 19 connecting with the vaporizing chamber, and it is provided furthermore with a lateral port 20 which when the valve is closed, registers with a passage 21 in the valve block. The port 20 opens in the lower portion of the valve bore at a comparatively short distance from the end of the same at which the ducts 19 are formed, and the passage 21 of the valve-block is by means of a conduit 22 connected with a conveniently located source of fuel supply.

Slidably fitted in the valve-bore, is a plunger 23 which in the operation of the engine functions to transfer the fuel entering through the port 20, to the vaporizing chamber 14 by means of the ducts 19. A hollow stem 24 slidably fitted in a casing 26 enclosing the valve structure and fastened upon the cylinder head, is connected at the protruding end of the valve and has at its outer end, an opening ordinarily closed by a flanged plug 25. The casing 26 has in its end an opening normally closed by a hollow screw plug 27, and a spiral spring 28, compressed between the two plugs, tends to yieldingly maintain the valve in its closed position.

The spring extends into the hollow screw-plug and by adjustment of the latter the pressure of the spring on the valve may be varied to a limited extent. A shaft 29 extending through alined openings of the casing and the hollow valve stem, has within the latter, a cam 30 which through the intermediary of an antifriction roller 31 at the end of a rocker-arm 32, acts upon the plug at the end of the valve-stem to periodically remove or displace the valve off its seat against the resistance of the spring 28.

A cross-bar 33 connected at the protruding end of the plunger in parallel relation to the shaft, likewise extends through openings in the valve stem and the casing and it is supported at its ends upon spiral springs 34 resting on the cylinder-head, which normally hold the plunger in a position in which its extremity within the valve bore is spaced from the end of the same. When the plunger is in this position the space in the valve constituting the plunger chamber, is in communication with the source of fuel supply, it being desirable to regulate the supply of fuel to the chamber by means of a pump, valve, or other suitable device.

Cams 35 on the shaft act upon the crossbar of the plunger through the medium of antifriction rollers 36 on rocker arms 37, to periodically move the plunger to the end of the valve bore against the resistance of the springs 34 whereby to force the fuel charge from the plunger chamber into the vaporizing chamber.

The cam-shaft and the rocker-arms are mounted in bearings which may be disposed in any convenient relation to the cylinder of the engine and which have not been shown in the drawings.

At the end of the valve-block within the low pressure region, is a plate 38 provided with a flaring opening 39 in register with the valve-port to aid in the diffusion of the fuel discharged through the port, in the air compressed within the cylinder. The parts of the valve-mechanism are normally in the position illustrated in Figures 1 and 2.

In the operation of a four-cycle engine, air is taken in during the intake stroke of the piston while the exhaust valve is closed.

The plunger 23 is moved into the valve bore by the action of the cams 35 on the rotating shaft as illustrated in Figure 4 with the result that the fuel admitted through the port 20, is forced through the small ducts 19 into the vaporizing chamber 14. The inward motion of the plunger breaks the fuel into small particles by forcing it through the orifices 19 and hurling it against the walls of the vaporizing chamber whereby it is mechanically broken up and finely divided.

During the second or compression stroke of the piston both the air-inlet valve and the exhaust valve are closed and the air-charge is compressed. Before the piston passes the dead center, the valve 9 is removed from its seat by the cam 30 to the position shown in Figure 5, thereby bringing the vaporizing chamber in communication with the low-pressure region 17 of the cylinder by means of the port 13, and with the high-pressure region of the same by means of the channels 15 and 16. The air in the region 17 is for a short period during maximum compression of the air, of lower pressure than that in the region 18 so that when the valve is opened the high pressure air will enter the vaporizing chamber through the by-pass and drive the fuel from the vaporizing chamber through the port 13 into the cylinder where it is ignited by the over compression of the air. During the opening movement of the valve the plunger is returned to its original position by the springs 34 and when, subsequently, the valve returns to its closed position, the plunger will remain in the open position shown in Figure 1, until it is again actuated by the respective cams on the camshaft.

In the third or power stroke of the piston, both the air inlet-valve and the exhaust valve are closed, the valve 9 returns to its normal closed position in which the port 13 of the valve chamber is closed and the vaporizing chamber is disconnected from the by-pass composed of the channels 15 and 16, and the plunger 23 supported on the springs 34 remains in its outward position thereby establishing the connection between the plunger chamber and the source of fuel as before.

During the fourth stroke in the cycle, the exhaust-valve is opened while the air-inlet valve remains closed and both the valve 9 and the plunger 23 remain in the position to which they were lastly moved, ready for repeated operation during the following cycle.

The different positions of the valve 9 and the plunger 23 have been shown diagrammatically in Figure 6, it being presumed that the cycle commences at A and the crank-movement is in the direction of the arrow.

During the first stroke of the piston, from A to B the plunger moves inwardly as from C to D to force the charge of fuel into the vaporizing chamber and it remains in this position until the valve starts to raise off its seat during the second stroke B—E of the piston. The valve is lifted at F just before the power stroke E—G, admitting the charge to the cylinder for its ignition, and during the last mentioned stroke the valve is reseated from H to K, while at H the plunger is in its normal position as indicated in Figure 1.

The operation of the invention in a two-cycle engine is substantially similar.

Referring to Figure 7 the cycle begins at X, the plunger moves inwardly from L to Q to force the fuel charge into the vaporizing chamber, the valve opens at M to admit the charge to the combustion chamber, and is returned to its seat at N while the plunger is in its normal position at O ready to admit the fuel to the bore of the valve after the valve is reseated.

As a possible variation in the construction and operation of the invention, the passage 15 of the valve-block may be connected with a source of air under pressure separate from the engine-cylinder.

The modification has been illustrated in Figure 8 in which 40 designates the source of pressure, 41 the conduit connecting the source with the valve chamber, and 42 a valve controlling the flow through the conduit 41.

It will be evident that the constructions as shown and described are of particular advantage in that they prepare the fuel for combustion in a progressive process by mechanically breaking up the fuel as it is forced through the small orifices leading to the vaporizing chamber and causing it to impinge upon the walls of the chamber, by taking advantage of the thermal assistance obtained in the vaporizing chamber, and by making use of the turbulent action of the highly compressed air entering the vaporizing chamber through the by-pass, which tends to further atomize the fuel charge.

Having thus described my invention what I claim and desire to secure by Letters Patent is:—

1. In an internal combustion engine, a cylinder, a piston therein, a mixing chamber having an entrance for the admission of fuel, a discharge port connecting said chamber with the cylinder and a passage for the admission of a pressure fluid from the cylinder to said chamber, a valve controlling the discharge port and said passage, means for driving a charge of fuel into the chamber through the said entrance and mechanism for the operation of the valve and said means at determinate points in the movement of the piston.

2. In an internal combustion engine, a cylinder, a piston therein, a mixing chamber having a restricted entrance for the admission of fuel, a discharge port connecting said chamber with the cylinder, and a passage for the admission of a pressure fluid from the cylinder to said chamber, a valve controlling the discharge port and said passage, means for driving a charge of fuel into the chamber through said entrance and mechanism for the operation of the valve and said means at determinate points in the movement of the piston.

3. In an internal combustion engine, a cylinder, a piston therein, a mixing chamber having an entrance for the admission of fuel and having a discharge port, and a passage for the admission of pressure fluid, said cylinder having a low pressure region adjacent to said discharge port, a valve controlling said port and said passage, means for driving a charge of fuel into the chamber through said entrance, means for forcing air into said chamber under pressure through said passage and mechanism for the operation of the valve and said fuel driving means at determinate points in the movement of the piston whereby said air will force the charge of fuel under pressure into low pressure region.

4. In an internal combustion engine, a cylinder, a piston therein, a mixing chamber having an entrance for the admission of fuel and having a discharge port and a passage for the admission of pressure fluid, said cylinder having a low pressure region adjacent to said discharge port, a valve controlling said port and said passage, means for driving a charge of fuel into the chamber through the first named entrance, and means for forcing the pressure fluid through the said passage into said chamber, and mechanism for the operation of the valve in synchronized relation to the pressure fluid means.

5. In an internal combustion engine, a cylinder, a piston therein, a mixing chamber having an entrance for the admission of fuel and having a discharge port and a passage for the admission of pressure fluid, said cylinder having a low pressure region adjacent to said discharge port, a valve controlling said port and said passage, means for driving a charge of fuel into the chamber through the first named entrance, and means for forcing the pressure fluid through the said passage into said chamber, and means to open said valve at predetermined points in the cycle of operation whereby said pressure fluid and fuel from the chamber will enter said low pressure region.

6. In an internal combustion engine, a cylinder, a piston therein, a mixing chamber having an entrance for the admission of fuel and having a discharge port and a passage for the admission of pressure fluid, said cylinder having a low pressure region adjacent to said discharge port, and a high pressure region in communication with said pressure fluid passage, a valve controlling said port and said passage, means for driving a charge of fuel into the chamber through said entrance, and mechanism for the operation of the valve and said fuel driving means at determinate points in the movement of the piston whereby air from the high pressure region will force the charge of fuel under pressure into said low pressure region.

7. In an internal combustion engine, a cylinder, a piston, a chamber having an entrance for the admission of fuel and a discharge port connecting with the cylinder, a hollow valve controlling the discharge port, means to supply fuel to said valve and from said valve to said chamber, means for driving a charge of air from the cylinder into said chamber under pressure, and mechanism for the operation of the valve and said means at determinate points in the movement of the piston whereby said air under pressure will force the charge of fuel through the discharge port into the cylinder.

8. In an internal combustion engine, a cylinder, a piston therein, a source of fuel supply, a vaporizing chamber having a discharge port connecting with the cylinder, a fuel receiving chamber connected with the source of fuel supply and with said vaporizing chamber by a restricted passage, a valve controlling the discharge port, means for forcing a fuel charge from the receiving chamber into the vaporizing chamber through the restricted passage, and means including said valve for forcing air under control, from the cylinder into the vaporizing chamber, and mechanism for the operation of the valve and said latter means at predetermined points in the engine cycle whereby said air will drive the charge of fuel through the discharge passage into the cylinder.

9. In an internal combustion engine, a cylinder, a piston therein, a source of fuel supply, a vaporizing chamber having a discharge port connecting with the cylinder, and having an inlet passage communicating with the cylinder, a valve controlling the discharge port and inlet passage, means for forcing a fuel charge into said vaporizing chamber, and for forcing air through said inlet passage into the vaporizing chamber, and mechanism for synchronizing the operation of the valve and said air forcing means whereby the air will force the fuel charge through the discharge port into the cylinder at determinate points in the movement of the piston.

10. In an internal combustion engine, a cylinder, a piston therein, a source of fuel supply, a vaporizing chamber having a discharge port connecting with the cylinder and having an entrance for the admission of a pressure fluid from the cylinder, a fuel receiving chamber connected with the source of fuel supply, and with the vaporizing chamber by a restricted passage, a valve controlling the discharge port and the entrance for pressure fluid to the vaporizing chamber, means for forcing a fuel charge from the receiving chamber into the vaporizing chamber through the restricted passage, and mechanism for the operation of the valve and said means at determinate points in the movement of the piston, whereby air will be transferred from the cylinder to the vaporizing chamber to force a charge of fuel through the discharge passage into the cylinder.

11. In an internal combustion engine, a cylinder, a piston therein, a source of fuel supply, a vaporizing chamber having a delivery port in connection with the cylinder and having an entrance for the admission of a pressure fluid, a spring pressed valve controlling the delivery port and the entrance of the vaporizing chamber and having a receiving chamber connected with the source of fuel supply and connected with the vaporizing chamber by a narrow passage, a spring-pressed plunger in the receiving chamber to drive the contents thereof into the vaporizing chamber, mechanism for the operation of the valve and plunger in opposition to the pressure of their springs at determinate points in the movement of the piston, and means including a passage controlled by said valve, to force air under pressure into said chamber from the cylinder and back into the cylinder through said discharge port, whereby said fuel charge will be vaporized and forced into the cylinder under pressure.

12. In an internal combustion engine, a cylinder, a piston therein, a source of fuel supply, a vaporizing chamber having a delivery port in connection with the cylinder and having an entrance in connection with the cylinder for the admission of a pressure fluid from the cylinder, a spring pressed valve controlling the delivery port and the entrance of the vaporizing chamber and having a receiving chamber connected with the source of fuel supply and connected with the vaporizing chamber by a narrow passage, a spring pressed plunger in the receiving chamber to drive the contents thereof into the vaporizing chamber, and a rotary shaft having cams acting upon the valve and the plunger in opposition to the pressure of their springs for the operation of the valve and plunger at determinate points in the movement of the piston.

13. In an internal combustion engine, a cylinder, a piston therein, a source of fuel supply, a vaporizing chamber having a delivery port, and an entrance for the admission of pressure fluid, each connected to the cylinder, a valve controlling the delivery port and the entrance and having a receiving chamber connected with the source of fuel supply and connected with the vaporizing chamber by a narrow passage, a hollow stem on the valve, a spring pressing on the stem, a plunger in the receiving chamber to drive the contents thereof into the vaporizing chamber, a yoke on the plunger, a spring pressing on the yoke, and a rotary shaft having cams acting on the valve and the plunger in opposition to the pressure of their springs for the operation of the valve and the plunger at determinate points in the movement of the piston.

14. In an internal combustion engine, a fuel receiving chamber, a vaporizing chamber connected with the receiving chamber by an orifice, a cylinder having a low pressure region and a high pressure region, said vaporizing chamber having an inlet passage connecting with said high pressure region, and a discharge passage connected with said low pressure region, and a valve controlling said passages, means for driving the fuel from the receiving chamber through the orifices and into the vaporizing chamber thereby breaking up the fuel, and means for heating the vaporizing chamber and driving the fuel through said discharge passage.

15. In an internal combustion engine, a cylinder, a vaporizing chamber having a discharge means, connected with the cylinder, means to supply fuel to said chamber, means for heating the vaporizing chamber, means for supplying a charge of pressure fluid from the cylinder to the vaporizing chamber to assist in breaking up the fuel and drive same into the cylinder, and control means common to said discharge means and said fluid supply means.

16. In an internal combustion engine, a cylinder, and a fuel vaporizing chamber, means providing a low pressure region and a high pressure region in said cylinder, said vaporizing chamber having an inlet connected to said high pressure region, an outlet connected to said low pressure region, and valve means controlling said inlet and outlet, means to force fuel into said vaporizing chamber, means to force pressure fluid from said high pressure region into said vaporizing chamber, and means to open said valve at determinate points in the cycle of the engine to permit said pressure fluid to force said fuel into the cylinder.

17. The method of charging an engine with fuel which comprises vaporizing the fuel, compressing air in the cylinder, and simultaneously by-passing a portion of said compressed air to the point of vaporization of the fuel and releasing the mixture of said by-passed air and fuel into the cylinder.

18. The method of charging an engine with fuel which comprises vaporizing the fuel at a point external of the cylinder, compressing air in the cylinder, providing a low pressure region and a high pressure region in the cylinder, and simultaneously by-passing a portion of said compressed air from the high pressure region to the vaporizing point and releasing the mixture of said by-passed air and fuel into said low pressure region.

In testimony whereof I have affixed my signature.

GEORGE T. JOHNSON.